US009189898B2

(12) United States Patent
Smolin

(10) Patent No.: US 9,189,898 B2
(45) Date of Patent: Nov. 17, 2015

(54) TACHOGRAPH HAVING AN INTERFACE FOR AN EXTERNAL DATA INPUT DEVICE

(75) Inventor: Denis Smolin, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 941 days.

(21) Appl. No.: 13/390,914

(22) PCT Filed: Jul. 15, 2010

(86) PCT No.: PCT/EP2010/060241

§ 371 (c)(1), (2), (4) Date: May 4, 2012

(87) PCT Pub. No.: WO2011/020660

PCT Pub. Date: Feb. 24, 2011

(65) Prior Publication Data

US 2012/0206514 A1 Aug. 16, 2012

(30) Foreign Application Priority Data

Aug. 18, 2009 (DE) ........................ 10 2009 037 804

(51) Int. Cl.

| | |
|---|---|
| ***B41J 29/393*** | (2006.01) |
| ***G06F 13/00*** | (2006.01) |
| ***G07C 5/08*** | (2006.01) |
| ***G07C 7/00*** | (2006.01) |

(52) U.S. Cl.

CPC . *G07C 5/085* (2013.01); *G07C 7/00* (2013.01)

(58) Field of Classification Search

USPC ............................................ 347/19; 711/115

See application file for complete search history.

(56) References Cited

U.S. PATENT DOCUMENTS

2008/0059701 A1* 3/2008 Esfandabadi ................ 711/115

FOREIGN PATENT DOCUMENTS

| | | |
|---|---|---|
| DE | 10 2004 030 869 | 1/2006 |
| DE | 10 2004 030 869 A1 | 1/2006 |
| EP | 0 895 199 A2 | 2/1999 |
| EP | 0 895199 | 2/1999 |
| EP | 0 918 222 A1 | 5/1999 |
| EP | 1 538 572 A2 | 6/2005 |

* cited by examiner

*Primary Examiner* — Jason Uhlenhake

(74) *Attorney, Agent, or Firm* — Cozen O'Connor

(57) ABSTRACT

A tachograph including a control unit and an output unit connected to the control unit, and an interface for connecting to a data but. The tachograph additionally includes a further interface, by which a network connection can be established between an external data input device and the output unit, so that data kept available on the external data input device can be output by the output unit.

13 Claims, 2 Drawing Sheets

TACHOGRAPH HAVING AN INTERFACE FOR AN EXTERNAL DATA INPUT DEVICE

CROSS REFERENCE TO RELATED APPLICATIONS

This is a U.S. national stage of application No. PCT/EP2010/060241, filed on 15 Jul. 2010. Priority is claimed on German Application No. 10 2009 037 804.9, filed 18 Aug. 2009, the content of which is incorporated here by reference.

BACKGROUND OF THE INVENTION

1. Field of the Invention

The present invention relates to a tachograph having an external data input and to a method and system in which such a tachograph is used.

2. Description of Prior Art

Tachographs, particularly digital tachographs, must be installed in commercial vehicles according to EU regulations. Usually, these tachographs are equipped with a printer used to produce printouts that are required legally. In this case, the relevant data is conditioned by the tachograph and then made available to the printer as the output device.

The tachograph receives the data it requires via a data bus, what is known as a CAN bus. By way of example, the CAN bus has an onboard computer or a speed pulse generator, which is arranged on a camshaft, connected to it. The data ascertained by the aforementioned devices are then sent via the CAN bus to all devices arranged on the data bus using a previously defined protocol, wherein the receiving device recognizes the data packets which are intended for it from an encoding.

In the case of a bus structure, the devices are connected to one another permanently. In particular, it is difficult in the case of the CAN bus to connect further devices besides the devices which are already arranged on the CAN bus without having to reconfigure the entire bus.

The document EP 0 895 199 A2 discloses a tachograph connected to numerous further devices by a data bus as cited above. These devices connected to the tachograph by the data bus are able to independently access a printer arranged in the tachograph, i.e. to send data directly to said printer, which data are then printed. In order to allow such actuation of the printer, the control unit of the tachograph must forward data directly intended for the printing unit to said printing unit. Normally, this is accomplished by assigning a bus address to the printer arranged in the tachograph.

SUMMARY OF THE INVENTION

A drawback of the solution described above is the necessary reconfiguration of the CAN bus when devices need to be added afresh. It is an object of one embodiment of the present invention is to improve a tachograph such that simple actuation of an output unit in a tachograph is made possible.

According to one embodiment of the invention, the tachograph has at least one further interface that can be used to set up a network connection between an external data input device, i.e. one which is not connected to the tachograph constantly or permanently, and an output unit in the tachograph, which output unit is in the form of a printing unit or display. The network connection that has been set up in this manner can be used for the output of data which are provided on the external data input device by the output unit.

The advantage of a network connection over a data bus connection is that the data provided in the external data input device is transferred exclusively and specifically to the output unit. In the case of a network connection, those partners to which the data need to be sent are first of all sought, then the connection is set up and the data is interchanged exclusively between the two network partners. In the present case, the network partners are the external data input device and the tachograph or the control unit in the tachograph or the output unit in the tachograph.

By providing a further interface, as described above, it is possible to allow numerous data input devices, such as personal digital assistants (PDAs) or mobile telephones, to access the printing unit of the tachograph. This does not require any reconfiguration of the CAN bus or of a general data bus to be performed, since only a temporary network connection is set up between the external data input device and the tachograph. Constant or permanent connection of the devices, as is required in the case of a data bus, is not necessary. This simplifies the method of actuating the external data input device with the tachograph.

To allow the output of data which is provided on the external data input device by an output unit in the tachograph, a network connection is set up between the external data input device and the further interface of the tachograph. When the network connection has been set up, the data from the external data input device which are intended to be output are transmitted to the output unit via the interface. This involves the data being forwarded, for example by the control unit in the tachograph, to the printing unit of the tachograph or a display of the tachograph. The data transmitted by the external data input device and intended to be output is then output by the output unit.

The tachograph according to one embodiment of the invention or the method performed using it is particularly suitable for connection to devices not permanently arranged in the vehicle or not permanently connected thereto. Although this is at the cost of the reliability of the robustness of the data link, such a failsafe connection appears necessary for the connections between the tachograph and the vehicle or engine devices arranged in the vehicle connected to the tachograph by the data bus. In the case of data input devices that are intermittently in the range of the further network interface of the tachograph such a high level of failsafety can be dispensed with, since there is no data present that is necessary for operation of the vehicle or for documenting the journey. By way of example, a system comprising a tachograph and an external data input device can be used to print orders received by a mobile telephone using the tachograph and then transferring the orders to a customer or transmission receiver. In this way, it is no longer necessary for further output units, particularly printing units, to be provided in the vehicle.

Various embodiments of the invention produced are explained below. In a one embodiment, the interface is an interface for setting up a wireless connection between the external data input device and the output unit. To this end, the tachograph has a transmission/reception unit that can wirelessly receive data transmitted by an external data input device equipped with a corresponding interface. This simplifies handling of the system. Alternatively, a wired network connection is possible.

In one embodiment, particularly when a plurality of external data input devices are present, the network in which the network connection between the external data input device and the tachograph is set up has a point-to-point topology or a star topology, wherein a node or the center of the star in the network is the tachograph. In this case, the connections can be continually set up and cleared without reconfiguring the entire network, since although the tachograph may receive numerous requests for setting up a connection, the data sent by the data input devices sending the requests are sent exclusively to the tachograph after the connection has been set up. Although there is the possibility of crosstalk between different connections, these can be largely avoided using methods which are known from the prior art and are beyond the scope of the present disclosure.

In a further embodiment, the further interface is not connected to the output unit directly but rather is connected to it indirectly. The further network interface is addressed by the control unit in the tachograph, with the latter possibly conditioning the data, converting it into a desired data format and transferring the transmitted data to the output unit in the data format that the output unit can read. Examples suitable for the printing unit in this context are text files, image files and Postscript formats or PDF formats.

BRIEF DESCRIPTION OF THE DRAWINGS

The invention is explained in more detail below with reference to exemplary embodiments. In the figures.

DETAILED DESCRIPTION OF THE PREFERRED EMBODIMENTS

Figure 1:
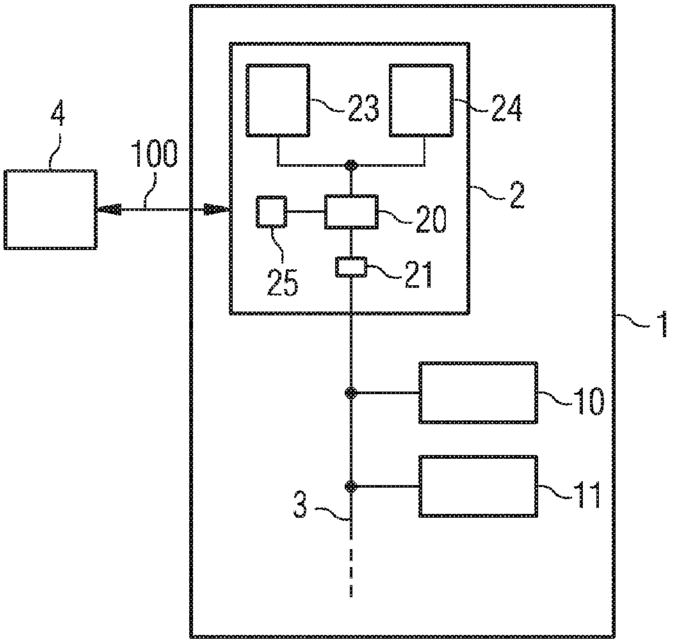
FIG. 1 is a schematic overview of one embodiment of a system according to the invention.

FIG. 1 shows a schematic illustration of a system having a tachograph according to one embodiment of the invention and an external data input device. It shows a vehicle 1 in which a tachograph 2 is arranged or installed. The vehicle contains further devices 10 and 11 along with others, which are connected to the tachograph 2 by a data bus 3 in the form of a CAN bus. The connection between the devices 10 and 11 and the tachograph 2 via the data bus 3 is a permanent connection and is handled in the protocol language which is inherent to the data bus 3. In particular, the data interchanged between the devices and the tachograph is transmitted to all devices configured in the data bus. That device or the tachograph for which the data transmitted via the data bus 3 is intended recognizes the data from an identification record, e.g. a header, which precedes the data record.

The tachograph 2 has a control unit 20 which has a first interface 21 and a further interface 25. In this case, the first interface 21 is used for connecting the tachograph 2 to the data bus 3. The further interface 25 is used for setting up a network connection 100 between an external data input device 4 and the tachograph 2. In this case, the network connection 100 is set up between the tachograph 2 and the external data input device 4 before data is interchanged via the connection 100 which has been set up in this manner. Further devices, whether external or internal, are not part of this network connection 100. The tachograph also has two output units 23 and 24, wherein the output unit 23 is a printing unit and the output unit 24 is a display unit.

Figure 2:
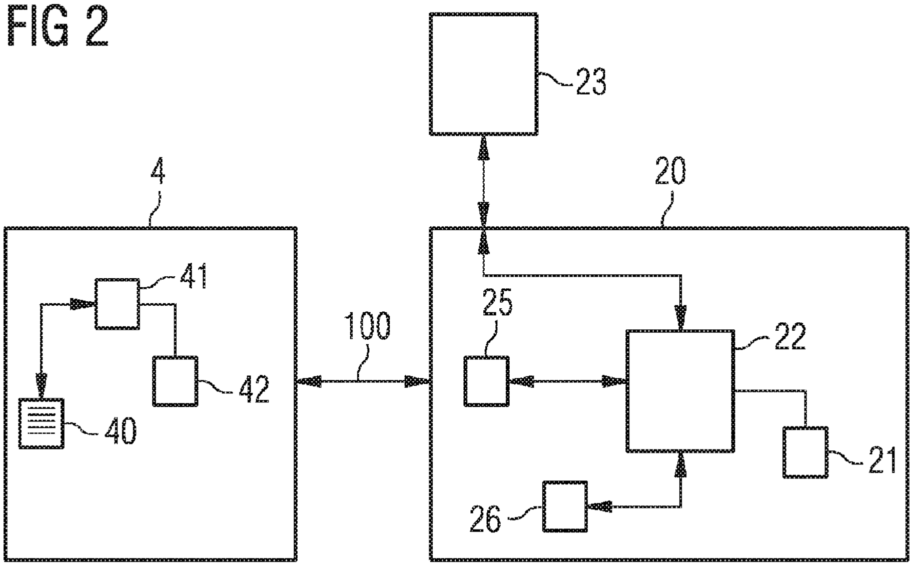
FIG. 2 is a detailed schematic view of the system.

The actuation of the output unit 23, i.e. the printing unit, will be discussed by way of example with reference to FIG. 2. The external data input device 4 comprises a control unit 41 and an interface 42, which is designed to set up a network connection 100—in a manner corresponding to the further interface 25. By way of example, the aforementioned network connection may be a connection within the context of a WLAN connection or a Bluetooth connection. In turn, it should be noted in this case, that such connections are used to connect only two partners to one another.

The external data input device is used to provide data 40 which is intended to be transmitted. Data 40 is transferred by the control unit 41 to the interface 42 and are transmitted to the further interface 25 of the tachograph 2 via the network connection 100, which is preferably wireless. In FIG. 2, only the control unit 20 is shown. This comprises not only the components already mentioned in FIG. 1 but also a CPU 22 and a unit for data format conversion 26. When the data 40 has been transferred via the network connection 100 to the interface 25, the data is transferred to the CPU 22 and converted into a format that can be read and output by the output unit 23 using the unit for data conversion 26. The data transmitted via the network connection 100 is not interchanged with the data bus 3 so as not to compromise the data integrity of the data interchanged via the data bus, since this is data that is important to the operation of the vehicle and which must not be manipulated by other connections when recorded by the tachograph 2.

Figure 3A:
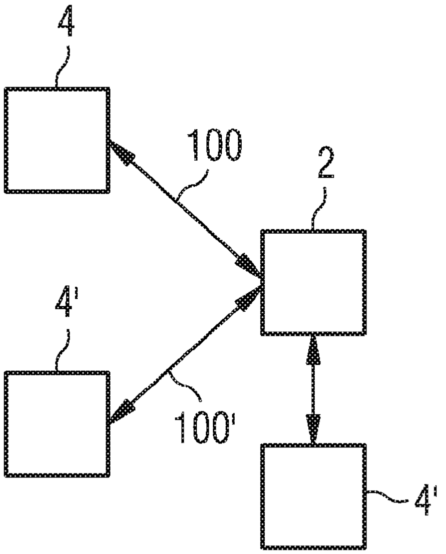
FIGS. 3*a, b* are different network topologies for setting up the connection.

The possible network topologies are now briefly discussed with reference to FIGS. 3*a* and 3*b*. FIG. 3*a* shows a star topology. In this case, different external data input devices 4, 4', 4" are connected to the tachograph 2 or the control unit 20 thereof by the associated network connections 100, 100', 100". The different data input devices 4, 4', 4" do not know of one another and do not receive any data from one another.

Figure 3B:
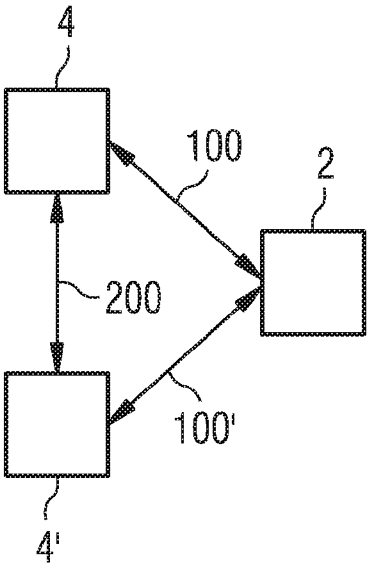

FIG. 3*b* shows a point-to-point network topology. In this case, a point-to-point connection can be set up between all subscribers in the network. This produces redundant paths for interchanging data between different units. This makes controlling the different partners in the network much more difficult, which means that a star topology is generally preferable.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tachograph, comprising:

a control unit;

an output unit connected to the control unit;

an interface configured to be connected to a data bus; and at least one further interface configured to establish a network connection between an external data input device and the output unit, wherein data provided on the external data input device is output by the output unit, and wherein data received at the further interface is not interchanged with the interface configured to be connected to the data bus.

2. The tachograph as claimed in claim 1, wherein the further interface is an interface configured to set up a wireless or wired network connection.

3. The tachograph as claimed in claim 2, wherein the network connection is set up in a network having one of a point-to-point topology and a star topology, wherein the control unit is a node in the network.

4. The tachograph as claimed in claim 3, wherein the further network interface is connected to the control unit.

5. The tachograph as claimed in claim 4, wherein the output unit is a printer unit.

6. The tachograph as claimed in claim 5, further comprising:

a display for at least one of visual output of data and operator control elements.

7. The tachograph as claimed in claim 1, wherein the network connection is established in a network having one of a point-to-point topology and a star topology, wherein the control unit is a node in the network.

8. The tachograph as claimed in claim 1, wherein the further network interface is connected to the control unit.

9. The tachograph as claimed in claim 1, wherein the output unit is a printer unit.

10. The tachograph as claimed in claim 1, further comprising: a display for at least one of visual output of data and operator control elements.

11. A method for output of data by a tachograph having a control unit, an output unit connected to the control unit, and also an interface configured to connect to a data bus, the method comprising:

setting up a network connection between an external data input device and a further network interface of the tachograph;

receiving data from the external data input device which is to be output by the further network interface to the output unit; and outputting the transmitted data that is intended to be output by the output unit, wherein the data received at the further interface is not interchanged with the interface configured to be connected to the data bus.

12. The method as claimed in claim 11, wherein the output unit is a printer unit.

13. A system comprising:

a data input device;

a tachograph arranged in a vehicle having:

an interface for connection to a data bus connected to further devices in the vehicle via the data bus;

at least one control unit;

an output unit connected to the control unit; and a further interface configured to set up a network connection between the data input device, which is not connected permanently to the further devices and the vehicle, and the output unit so that data provided on the data input device is output by the output unit, wherein data received at the further interface is not interchanged with the interface configured to be connected to the data bus.

* * * * *